United States Patent Office 3,313,738
Patented Apr. 11, 1967

3,313,738
METHOD OF TREATING ORE AND PRODUCT
William A. Rinehimer, Las Vegas, Nev., assignor to American Tansul Company, Las Vegas, Nev.
No Drawing. Filed Mar. 26, 1964, Ser. No. 355,054
6 Claims. (Cl. 252—428)

This invention relates to an improvement in the treatment or beneficiation of ores of swelling, gelling, cation exchangeable clays. More particularly, it relates to an improvement in the processing of such ores where the process is of the type that includes the incorporation of a humectant during the beneficiation of the clay.

The present invention is based upon the discovery that if the pH of a slurry containing the clay is adjusted to about 6.5 to 7.0 before adding the humectant, the rehydration rate of the dried clay-humectant product as well as the viscosity of the rehydrated product are dramatically improved.

Ores and clays within the present concept, the process for their beneficiation, and the incorporation of a humectant in the clay prior to the drying thereof so as to prevent calcining during the drying step is fully described in co-pending patent application, Ser. No. 355,070, filed Apr. 6, 1964, now Patent No. 3,189,557. The present invention is an improvement within the framework of the process and invention there described.

For present purposes the process described in said co-pending application will be only briefly stated. Taking hectorite ore for purposes of illustration, the ore is frequently sun dried to approximately 5% to 6% moisture after being mined. It is then processed through a grinding machine to reduce particle size so as to pass through about a 3/16″ mesh screen. The ground 3/16″ ore is then slurried preferably in hot water at about 190° F. to cause swelling and dispersion of the hectorite clay. In the swelled, dispersed condition it is passed over a screen to remove the larger pieces of calcite and other impurities which normally occur in the ore. After the calcite and other impurities are removed the slurry is centrifuged to further separate impurities such as calcite.

After calcite and other impurity removal a humectant is added to the slurry in accordance with the invention of said co-pending application. Following humectant addition the slurry is transported to dryers which may be of the steam heated drum type and which are operated at a maximum temperature of about 125° C. The slurry is transformed on the dryers into a dry sheet of about 3% to 4% moisture which may then be ground and packaged.

Based upon the above general sequence of steps the present invention requires adjustment of the pH of the slurry before the addition of the humectant to about 6.5 to 7.0. This pH range gives optimum results although as will be shown some improvement is obtained by adjustment of the pH so as to approach this range. However, by using the stipulated range of 6.5 to 7.0 a dramatic improvement in rehydration rate of the dried clay as well as improved viscosity of the rehydrated clay is obtained. The adjustment of the pH may be accomplished with any acid, either organic or inorganic. Addition of the acid may for convenience be as an aqueous solution of suitable concentration such as 1 N.

As before, the process may be executed with any swelling, gelling, cation exchangeable clay. Examples of these are beidellite, nontronite, the zeolites, the various synthetic clays, or preferably a clay such as hectorite chosen from the montmorillonite clays.

Also, in accordance with said co-pending application, any suitable humectant is employed which may be defined as a water soluble diluent which acts like water and which is deliquescent and hygroscopic to the extent of becoming liquid, and which has a boiling point above water and preferably higher than the operating temperature to which the clay is subjected during processing. The humectant is suitably chosen from the group consisting of organically derived polyols including glycerol or glycerin, propylene glycol, ethylene glycol, polyethylene glycol, as well as polysaccharide materials, either natural, synthetic or modified, such as sorbitol or hexahydric alcohol, dextrine and dextran.

The amount of humectant added will vary with the desired properties in the end product but will generally be added in an amount which will prevent calcining of the clay during the drying step and which will improve its rehydration and viscosity properties after drying. Most often the humectant is added in an amount of about 1 to 20% by weight of the total solids in the slurry prior to drying. In some cases humectant is lost during the drying process where the selected humectant is particularly subject to this occurrence. Additional quantities of humectant may have to be added prior to drying so as to end up with 1 to 20% by weight of humectant in the end product. Using sorbitol, which is a preferred humectant, the loss during drying is particularly small. For example, where 5% sorbitol is added to the slurry about 3% to 5% will remain in the end product.

The product resulting from the present improvement (i.e., pH adjustment prior to humectant addition) has been shown to exhibit a viscosity increase when rehydrated on the order of about 50 times that of an untreated clay product that is dried and reslurried in the same manner. The following experiments will illustrate this improvement as well as the improvement in accelerated rehydration rates.

Four samples of hectorite were processed in the general manner noted above. Sorbitol was added as humectant to three of the samples prior to drying so as to constitute 5% by weight of the solids in the slurry. In one sample no humectant was added. In the case of the sample without humectant the pH was adjusted to about 6.5 with hydrochloric acid prior to drying. In two of the other samples the pH was adjusted to 6.5 and 7.5 respectively as indicated below prior to humectant addition. The remaining sample contained sorbitol humectant but the pH was not adjusted prior to its addition. Relative rates of rehydration were then observed to be as follows:

| Sample: | Relative rehydration rate |
|---|---|
| (1) Hectorite plus 5% sorbitol—no pH control | Slow. |
| (2) Hectorite plus pH adjusted to 6.5—no humectant | Slightly faster than Sample 1. |
| (3) Hectorite plus 5% sorbitol plus pH adjusted to 7.5 | Faster than either Samples 1 or 2. |
| (4) Hectorite plus 5% sorbitol plus pH adjusted to 6.5 | Very much more rapid than any of the other samples. |

It is noted that some adjustment of pH as in Sample 3 improved its rehydration rate. However when the pH was adjusted to within the critical pH range of about 6.5 to 7.0 as in Sample 4, a difference in kind was observed as to rehydration rate.

Viscosity during rehydration of the dried end product is also dramatically increased by acid addition to create the noted critical pH range preparatory to humectant addition. To illustrate this point four hectorite samples were prepared in the manner above described. One sample received no acid or humectant to serve as a control. The other three samples were prepared with 5% and 10% additions of sorbitol humectant prior to drying as indicated. In these latter three samples the pH of the slurry was adjusted to about 6.5 prior to addition of the sorbitol with the acids specified.

The dried samples were then used to form a 2% aqueous slurry and the viscosities measured with a Brookfield viscometer using the #3 spindle. The observed values are shown below in centipoise.

| Material | Time (minutes) | | | | |
|---|---|---|---|---|---|
| | 1 | 3 | 5 | 7 | 10 |
| Acetic Acid plus 5% Sorbitol | 750 | 810 | 900 | 920 | 925 |
| Acetic Acid plus 10% Sorbitol | 625 | 740 | 770 | 800 | 800 |
| Hydrochloric Acid plus 5% Sorbitol | 1,240 | 1,310 | 1,350 | 1,350 | 1,360 |
| Control hectorite | 20 | 20 | 20 | 20 | 20 |

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improved method for treating an ore of a swelling, gelling, cation exchangeable clay comprising removing calcite from the ore, slurrying the ore, adjusting the pH of the slurry to about 6.5 to 7.0, then adding a humectant selected from the group consisting of water soluble organic polyols and water soluble polysaccharides in an amount sufficient to prevent calcining during drying, and then drying the slurry.

2. An improved method for treating a montmorillonite ore comprising separating calcite from said ore, slurrying the ore, adjusting the pH of the slurry to about 6.5 to 7.0 then adding a humectant to the slurry selected from the group consisting of water soluble organic polyols and water soluble polysaccharides so as to constitute about 1% to 20% by weight of the solids in the slurry, and then drying the slurry.

3. An improved method for treating hectorite ore comprising separating calcite from the hectorite ore, grinding the hectorite, slurrying the hectorite, adjusting the pH of the slurry to about 6.5 to 7.0, then adding about 5% by weight of the slurry solids of sorbitol to the slurry, and then drying the slurry.

4. In the method of treating an ore of a swelling, gelling, cation exchangeable clay to remove calcite impurities and including the step of adding a humectant to an aqueous slurry of said ore before drying, the improvement which comprises adjusting the pH of said slurry to about 6.5 to 7.0 prior to the addition of said humectant.

5. The improvement in accordance with claim 4 wherein the clay is hectorite and the humectant is sorbitol.

6. An improved method for treating an ore of a swelling, gelling, cation exchangeable clay comprising removing calcite from the ore, slurrying the ore, adding acid to the slurry to lower the pH thereof, then adding a humectant selected from the group consisting of water soluble organic polyols and water soluble polysaccharides in an amount sufficient to prevent calcining during drying, and then drying the slurry, the amount of acid added to the slurry prior to the humectant being sufficient to accelerate rehydration of the dried slurry and to increase its viscosity.

References Cited by the Examiner

UNITED STATES PATENTS 2,758,010  9/1956  Rowland _____ 23—110.2
3,148,159  9/1964  Hodgkiss _____ 252—450

DANIEL E. WYMAN, *Primary Examiner.*

TOBIAS E. LEVON, *Examiner.*

P. D. FREEDMAN, L. G. XIARHOS,
*Assistant Examiners.*